US005580583A

United States Patent [19]
Caridis et al.

[11] Patent Number: 5,580,583
[45] Date of Patent: Dec. 3, 1996

[54] SHEETER MACHINE

[75] Inventors: Andrew A. Caridis, San Carlos; Anthony A. Caridis, Belmont; Clark K. Benson, Millbrae; Lawrence F. Klein, Hillsborough; Daniel E. Brown, San Mateo, all of Calif.

[73] Assignee: Heat and Control, South San Francisco, Calif.

[21] Appl. No.: 492,572

[22] Filed: Jun. 20, 1995

Related U.S. Application Data

[63] Continuation of Ser. No. 110,392, Aug. 23, 1993, abandoned.

[51] Int. Cl.$^6$ .................................................. A21C 3/02
[52] U.S. Cl. .................. 425/142; 425/310; 425/363; 425/367; 425/502; 425/503; 425/518
[58] Field of Search .............................. 425/310, 312, 425/142, 145, 308, 363, 367, 313, 296, 297; 426/502, 503, 518

[56] References Cited

U.S. PATENT DOCUMENTS

| | | |
|---|---|---|
| 2,034,346 | 3/1936 | Lauterbur . |
| 2,317,447 | 4/1943 | Domizi . |
| 2,471,392 | 5/1949 | Campbell ................... 425/363 |
| 2,847,311 | 8/1958 | Doumak et al. ............ 425/518 |
| 2,958,094 | 11/1960 | Curletti ...................... 425/294 |
| 3,316,586 | 5/1967 | Sommer . |
| 3,339,228 | 9/1967 | Seanor et al. .............. 425/142 |
| 3,469,540 | 9/1969 | Werner . |
| 3,541,974 | 11/1970 | Atkins . |
| 3,872,752 | 3/1975 | Remde . |
| 3,911,805 | 10/1975 | Baird . |
| 3,956,517 | 5/1976 | Currey . |
| 4,205,951 | 6/1980 | Sollich . |
| 4,302,478 | 11/1981 | Hamman et al. ........... 425/367 |
| 4,348,166 | 9/1982 | Fowler . |
| 4,405,298 | 9/1983 | Blain . |
| 4,966,541 | 10/1990 | Mistretta . |
| 5,064,584 | 11/1991 | Jefferies . |
| 5,108,772 | 4/1992 | Wilbur ........................ 426/446 |
| 5,158,724 | 6/1992 | Yagi et al. .................. 264/40.1 |
| 5,158,792 | 10/1992 | Morikawa et al. ......... 426/231 |
| 5,180,593 | 1/1993 | Mistretta . |
| 5,246,654 | 9/1993 | Ertle et al. ................. 264/141 |

FOREIGN PATENT DOCUMENTS 340383  11/1989  European Pat. Off. . .

OTHER PUBLICATIONS

Private communication of Feb. 4, 1994, Attn: Don Giles of Heat and Control, Inc., From: Thomas R. Lugar of Thomas L. Green & Co., Inc.

*Primary Examiner*—Khanh P. Nguyen
*Attorney, Agent, or Firm*—Flehr, Hohbach, Test, Albritton & Herbert

[57]  ABSTRACT

A sheeter machine and process is disclosed which eliminates the use of at least one stripper wire or doctor blade wherein the dough, including masa, is worked between pinch rolls rotating at selected, infinitely varying speed ratios enabling controlled differential adhesion characteristics between the dough material being sheeted and the surfaces of the rolls. Variable cutter speed ratios acting with the front roll enable control of the cut product size.

5 Claims, 5 Drawing Sheets

SHEETER MACHINE

This is a continuation of application Ser. No. 08/110,392 filed Aug. 23, 1993 now abandoned.

FIELD OF THE INVENTION

The present invention relates to an improved sheeter machine for processing dough, including masa, into food products, such as tortillas and chips and particularly concerns a sheeter wherein the rolls are configured and operated at selectively variable speeds to minimize the reliance on stripper wires and their associated mechanisms.

BACKGROUND OF THE INVENTION

The process for preparing dough into sheets such as for ethnic Mexican foods including tortillas, corn chips and the like requires a masa to be made from wet milled corn or corn flour, water and other additives. For certain other products, the dough may be made from rice, wheat flour and bean flour, etc. The dough or masa is processed into sheet form by being compressed between pinch rolls and cutters are then applied against the front roll (the roll nearest to the take out conveyor) to develop the selected shape for the product. After cutting, the product may be further formed and cooked as by toasting, baking or frying, or in the case of tortillas, the product may be heat treated and packaged for later use.

The sheeting operation can be of critical importance in preparation of food products of this general type because of the natural variations of the physical properties of the dough or masa. It has been observed that the visco-elastic mass properties of the dough may vary as often as every 20 minutes which is a typical batch duration. The variations in coarseness or particle size of the corn flour, adhesive properties and moisture content in the masa influence the quality of the sheeted product. Many of the prior art sheeters were incapable of accommodating the wide variations in the visco-elastic mass properties of the masa dough and were unable to produce a product within specifications. The operators of such equipment would frequently completely discard entire batches of masa because the machines could not maintain product specifications. This was costly in lost production time and wasteful of raw materials.

Particularly in constructions where the sheeting rolls had stripper wires to separate the formed sheet below the nip, special attention was required for the proper position and tension of the stripper wire to assure adequate force between the stripper wire and the roll. Commonalty, the back roll was machined to a convex profile, an exacting and expensive operation, and the front roll was machined to a complimentary concave profile in order to ensure an accurate gap or nip between the rolls. In the case of the concave roll, the position of the stripper wire is skewed at an awkward angle and the products stripped from the roll fall different vertical distances onto the conveyor there below a may be misaligned laterally on the conveyor. The Oct. 30, 1990 to Joseph L. Mistretta, U.S. Pat. No. 4,966,541 addressed the difficulties of positioning the stripper wire against the convex face of the back roll and implied that the existence of the stripper wire was critical to effective and efficient sheeting of masa. The Jan. 19, 1993, to Mistretta, U.S. Pat. No. 5,180,593, shows driving the back and front rolls at the same surface speed and positions stripper wires on both the front and the rear rolls. The rear roll and cutter roll are driven from the front roll through a spur gear arrangement. There was apparently no perception in the prior art of selectively varying speeds over a wide range of either the cutter or the back roll to keep the products within specifications and to achieve efficient and effective sheeting without the use of a stripper wire or a doctor blade engaging the masa adjacent to the back roll. The elimination of the stripper wire or doctor blade and their attendant problems of adjustment and constant repositioning is an objective long sought.

In the processing of the products, such as masa, it is common to find that the material for dough varies in consistency from batch to batch. The machine operators will find the masa to differ in particle size, stickiness, cohesiveness, abrasiveness, flowability, and similar characteristics. This has been found to influence the shape, weight, thickness and quality of the final product. To accommodate some of these variables, it has been the practice of changing the speed of the machine pinch rolls such as by changing the gearing of the front and back rolls as well as the gearing of the cutter. The limitations of available gear sets is a problem when the operator needs a speed change that lies within less than one gear tooth, that is to say, the calculated fraction of a gear tooth. One producer has changed the speed of the back roll to rotate slower than the front roll and has eliminated use of the stripper wire or doctor blade. Although changing gearing helps to accommodate variations in the product characteristics, it is recognized that it is costly not only from the standpoint of the mechanics' labor in effecting the change, but also in the down time of the production line in which the sheeter operates. Frequently the masa during down time will go "off" flavor and must be discarded.

As the material properties change, the size of the die cut product will change in the direction of travel at a varying rate as it is striped from the front roll and the size and weight of the finished product is directly affected by the varying masa properties and may drift outside of the allowed specifications. Thus, it is highly desirable to accommodate the variations in the masa while making the necessary change to the sheeter without shutting down the entire processing line.

SUMMARY OF THE INVENTION

In summary, the present invention comprises an improved sheeter machine adapted to receive a supply of masa or the like to be sheeeted and includes a frame upon which are rotatably mounted front and back rolls, with the rolls being arranged so that their exterior surfaces are slightly spaced apart to define a nip disposed to receive masa dispensed from the supply. Means are provided for establishing a differential adhesion potential between the masa and the back roll from the masa and the front roll so that the masa, below the nip, departs from the surface of the back roll without the intervention of a stripper wire or doctor blade and it fully adheres to the surface of the front roll for cutting purposes. Stripping means are provided for separating the sheeted masa from the exterior surface of the front roll.

A general object of the present invention is to provide an improved sheeter machine which overcomes the limitations of the prior art which required the use of either a stripper wire or doctor blade for removing sheeted dough material from the back roll.

Another object of the invention is to provide in a machine of the type described means establishing a differential adhesion characteristic between the sheeted dough material and the back roll and the sheeted dough material and the front roll so that the sheeted material adheres to front roll for cutting and separates from the back roll after the sheeting action through the nip.

Another object of the invention is to provide an improved sheeter machine which allows for an infinite range of differential surface speeds between the front and back rolls.

Another object of the invention is to provide in a sheeter machine a variable speed drive control for the back roll for enabling variations in the roll surface speed as needed to fulfill processing requirements or to provide a variable speed transmission acting on the front and back rolls.

Another object of the invention is to provide a sheeter machine having an infinitely variable speed drive control coupled to the product cutters so as to better control the variations in the size, shape, flatness and weight of the cut product by varying the surface speed of the cutter as compared to the surface speed of the front roll.

Another object of the invention is to provide an improved sheeter which has the capability of accommodating wide variations which could occur many times a day and in the different seasons of the year in the stickiness, abrasiveness, moisture content, and the like of the sheeted material by enabling changes to the relative surface speeds of the pinch rolls which changes may be made while the production line is in full operation so as not to require the suspension of production for making changes.

Additional objects and features of the invention will be understood from a reading of the following description taken in connection with the accompanying drawings.

DESCRIPTION OF THE PREFERRED EMBODIMENT

Figure 1:
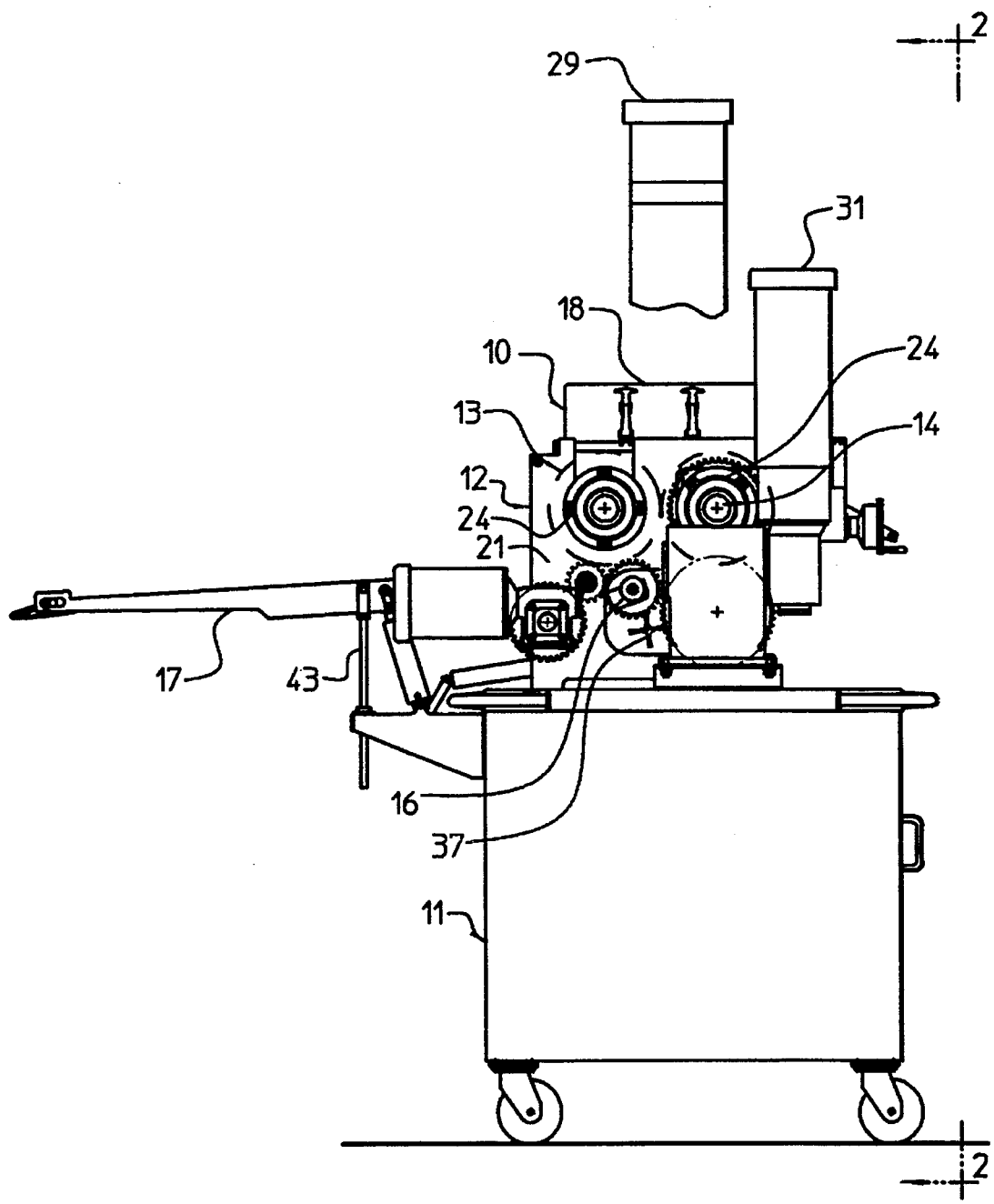
FIG. 1 is a side elevation of an improved sheeter machine made in accordance with the principles of the present invention.
Figure 2:
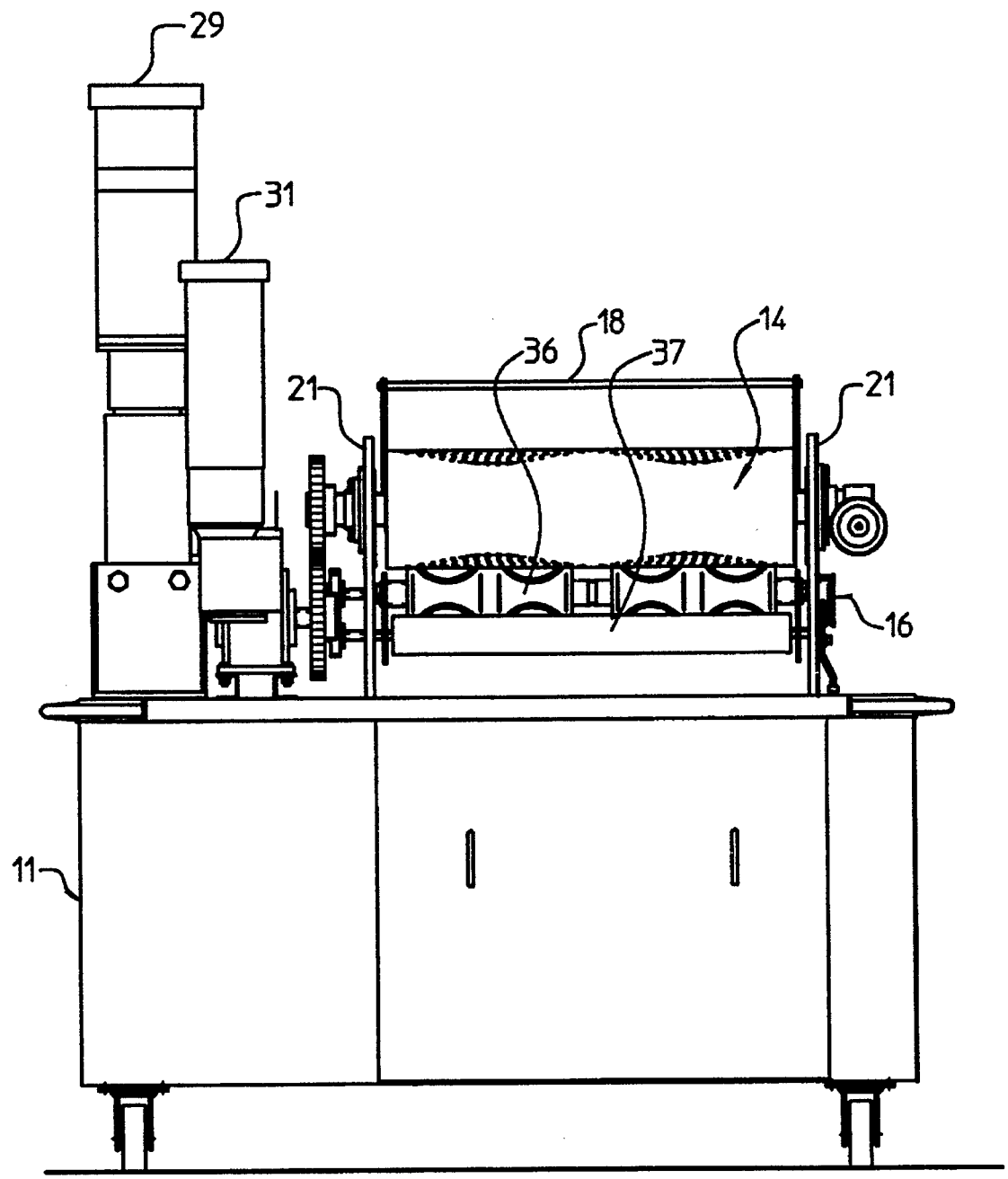
FIG. 2 is an end view taken in the direction of the arrows 2—2 in FIG. 1.
Figure 3:
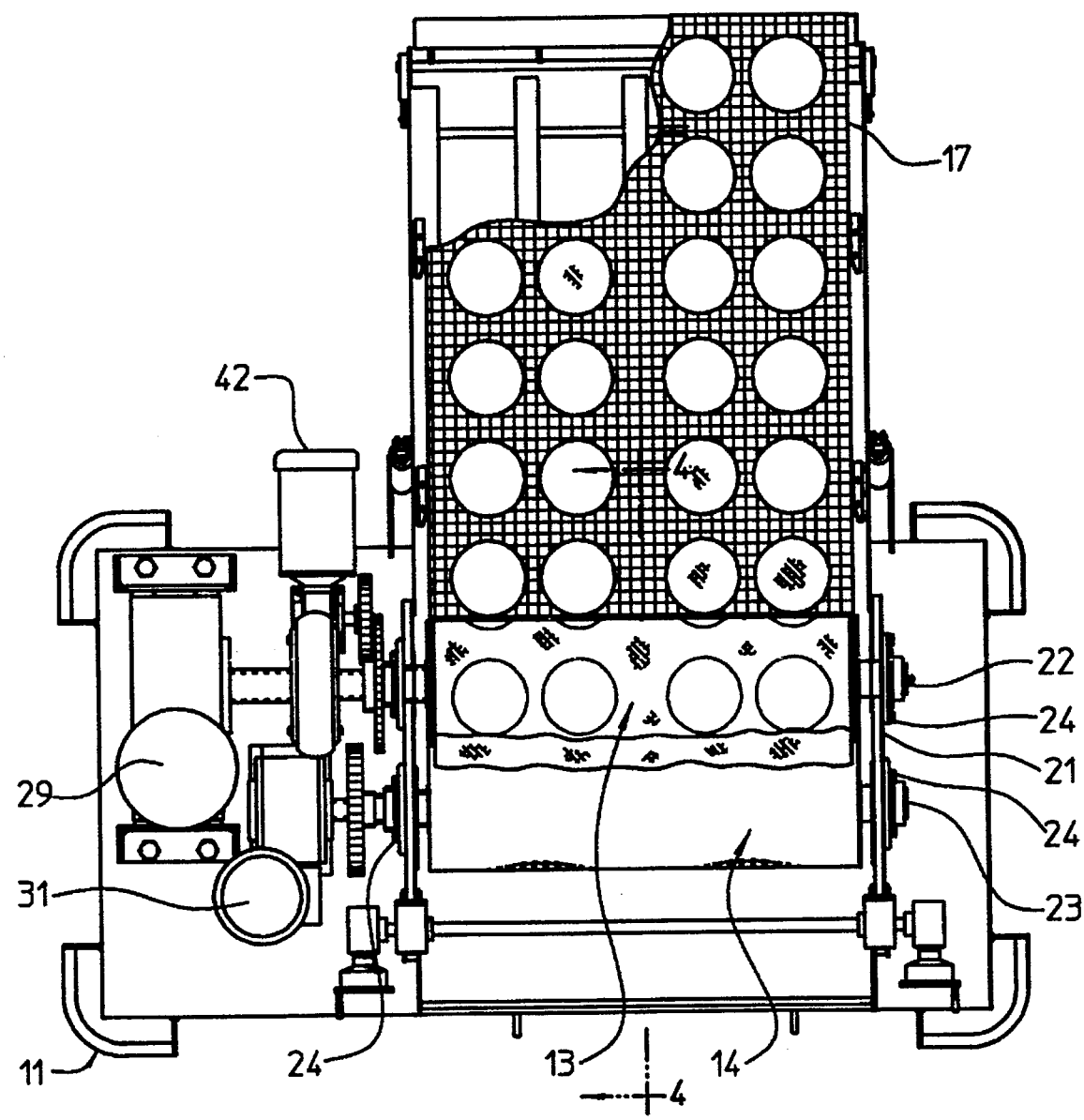
FIG. 3 is a plan view of the sheeter machine showing FIG. 1.

Referring to FIGS. 1–3, an improved shooter machine 10 is shown and comprises a base frame 11, a corn head assembly 12, which includes front 13 and back 14 pinch rolls, a cutter assembly 16 and an off-leading conveyor assembly 17. A dough supply source such as a hopper 18 may contain a supply of dough, such as masa, is mounted with respect to the machine 10, above rolls 13 and 14, the lower portion of the hopper being open to discharge a supply of masa into the nip defined between the rolls 13, 14.

The base frame 11 may be of conventional construction and may include a cabinet mounted on wheels to facilitate moving the unit into and out of a production line for producing products such as tortillas, tortilla chips, corn chips, and the like, where mixed dough is supplied to the hopper 18 and then formed by the shooter machine 10 and sent forward in the production line to the off loading conveyor 17 to an oven or an oven and a deep fat fryer (not shown) for final cooking. Alternatively, formed products such as tortillas may be sent out with a simple heat treatment and packaged for later use. The base frame 11 is of sufficient strength to support the operating sheeter mechanism including the variable speed drive motors associated with their reduction gear boxes, etc.

The corn head assembly 12 include the upstanding side frame plates 21 (shown in FIGS. 2 and 3) which serve as a mounting support for the rolls 13, 14 and their associated support bearings and other drive components. More particularly, each of the rolls 13, 14 includes a shaft 22, 23 respectively (FIG. 4), the ends of which are carried by the bearing assemblies 24.

Figure 4:
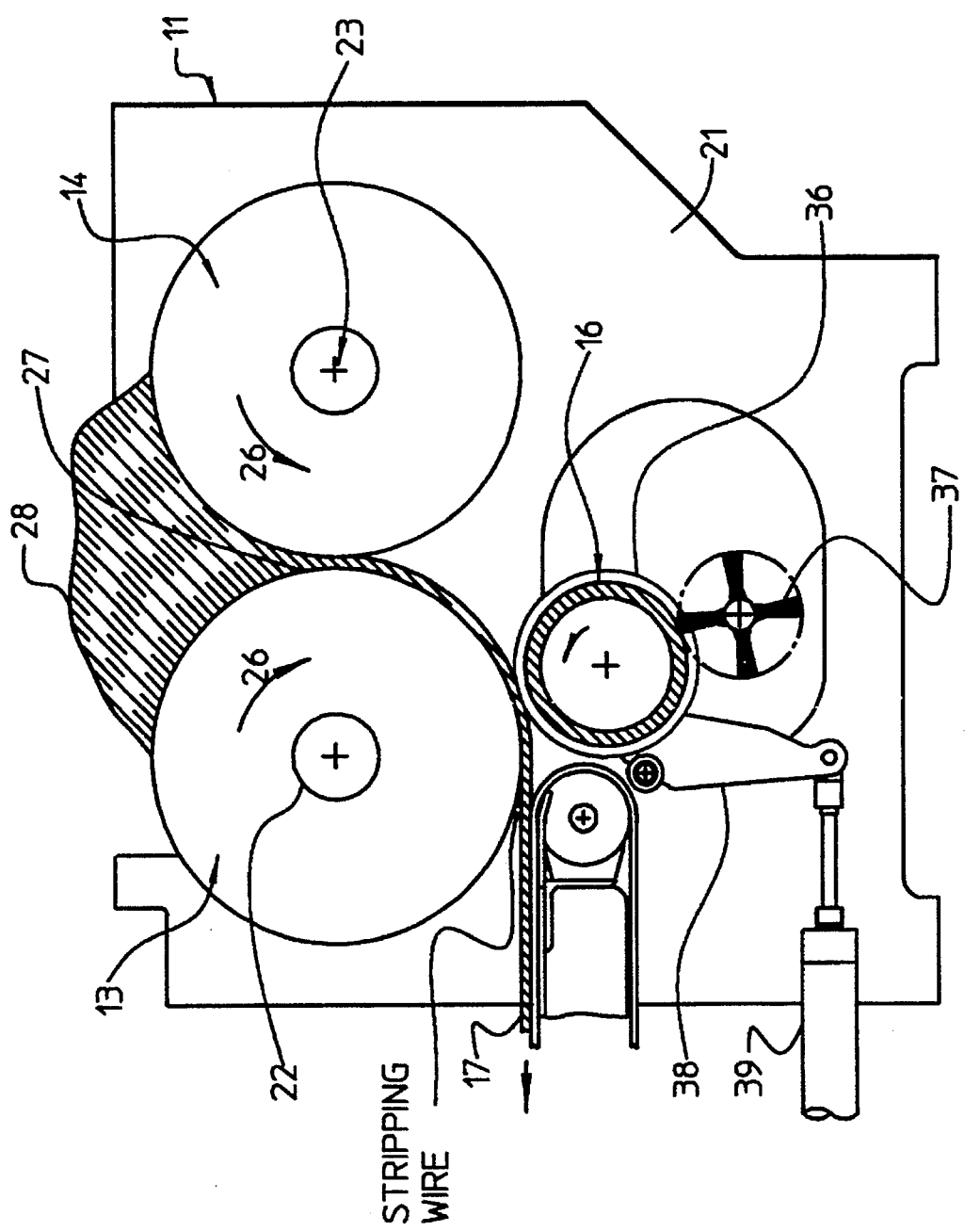
FIG. 4 is an enlarged sectional view taken in the direction of the arrows 4—4 in FIG. 3.

As indicated by the arrows 26 in FIG. 4, the rolls 13 and 14 are driven in a counter-rotation relationship so as to define an axially extending nip 27 which serves to compress and work the dough 28 into the desired thickness as established by the spacing which may be varied between the exterior surfaces of the rolls 13 and 14 at the nip 27. Unlike the prior art, there is no doctor blade or stripper wire positioned at just below the nip 27 for removing masa from the back roll 14. A stripper wire assembly (not shown) of conventional construction may be employed in cooperation with the front roll 13 for removing product most efficiently from the roll after the operation of the cutter assembly 16.

Greatly assisting the separation of the compressed dough from the exterior cylindrical surface of the back roll 14 is the speed of driving the back roll relative to the speed of driving the front roll 13. One manner of creating a differential adhesion potential between the masa and the two rolls 13, 14 is to drive the back roll 14 at a surface speed slower or faster than the surface speed of the front roll 13. This contrasts with the prior art in which the surface speeds generally were the same on both sheeter pinch rolls. The front and back rolls are driven independently, the front roll by a variable speed drive assembly 29 and the back roll by variable speed drive assembly 31. Each drive assembly 29, 31 includes a speed reduction gear drive and a brake. Suitable driving couplings are provided between the motor drive assembly 29 and the shaft 22 of the front roll as well as between the variable speed motor drive assembly 31 and the shaft 23 of the back roll. A suitable drive assembly 29 for the front roll has been found to be a Sterling Electric single reduction speed reducer, Sterling No. 700BC-50-213TC-2 from Sterling Electric Company in Irvine, Calif.; Balder Electric Motor, 7½ Hp, No. VBM3710T, Ft. Smith, Ak.; Allen-Bradley Variable Frequency AC Motor Drive, No. 1336-B007, Milwaukee, Wis.

A suitable variable speed drive for the back roll was found to be Peerless-Winsmith, Inc., Springville, N.Y., Winsmith Double Reduction Speed Reducer, No. 7MCTD; Seco Electronics, Lancaster, S.C., Seco DC Motor, 3 Hp, No. MOK7210800; Seco Variable Speed DC Motor Control, No. SE2005.

In operation, varying the speed of the back roll a range may be selected from 5 to 60 RPM. The front roll may be driven with suitable gearing at from 25 to 60 RPM. Highly effective sheeting of a high moisture masa (50% moisture) was achieved when driving the back roll at 66% of the speed of the front roll where previously it had been very difficult to sheet such very sticky masa using a doctor blade on the back roll which is one example. Certain products can be better handled with the back roll driven at a faster surface speed than the front roll.

The rolls 13 and 14 may be constructed to the same outside diameter and surface texture although this is not critical to this embodiment for achieving a differential in adhesion properties between the two rolls with respect to the material being sheeted.

Figure 5A:
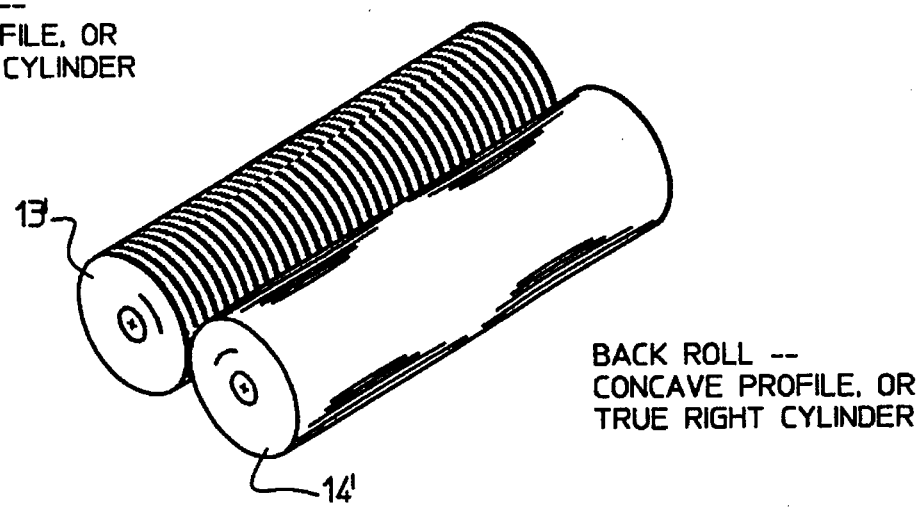
FIGS. 5A and 5B are fragmentary, diagrammatic views of alternative embodiments of the rolls included in the present invention.

Referring now to FIG. 5A, the rolls 13' and 14' shown there for another embodiment of the invention are made so that one of the rolls, for example the back roll 14', has a finish with a different "tooth", for example, a lesser "tooth" than that of the front roll. This effect can be realized by machining the smoother surface, grinding or polishing, plating or coating, etc. on the roll 14' and the other roll 13' can be furnished with a normal sandblasted finish. The rolls 13' and 14' can each be constructed from a different material or a metal plating or a plastic material can be applied to the surfaces of the rolls.

Figure 5B:
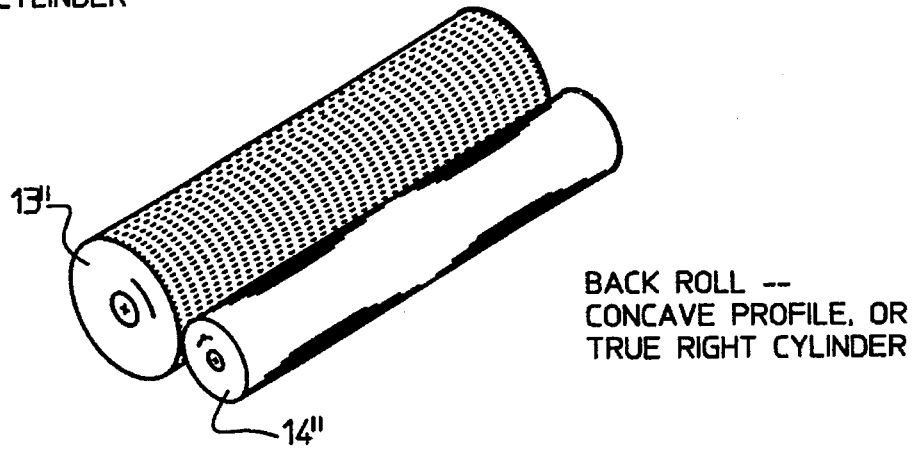

Referring now to yet another embodiment as shown in FIG. 5B, in order to achieve the differential in adhesion, a back roll 14" can be made in a smaller diameter than the front roll 13".

The rolls of these embodiments may be constructed as true right cylinders or the front roll may be crowned or ground to a convex profile which greatly assists in maintaining effective stripping forces between the stripper wire and roll. A convex roll needs less skew in the stripper wire than does either a concave or true right cylinder roll. With less skew, the trajectory of the cut product onto the take out conveyor is greatly improved and results in fewer product defects. This serve to establish a substantially common product transfer point from one side of the roll to the other.

The back roll can be shaped complimentary to the front roll and thus would be concave in profile where the front roll is convex. In the prior art, the back roll was customarily convex in profile so as to accommodate the tensioned stripper wire employed and then necessarily the front roll was concave in profile.

The cutter assembly 16 is shown in FIGS. 2 and 4 and comprises a cutter roll 36 and cleaner brush assembly 37. The shaft of the cutter roll 36 is mounted on the cam plate 38 which operates as a bell crank driven from the cylinder 39, (FIG. 4). The cutter roll 36 is driven in the direction of the arrow 41 as shown in FIG. 4 by a variable speed motor drive 42, FIG. 3. Although the cutter may be operated at the same peripheral or surface speed as the front roll 13 moves, it has been found that by varying the speed of the cutter by small numbers of RPM's and fractions of RPM's, the shape of the product may be changed in desirable ways. For example, where the product due to the consistency of the masa, has been cut and found to be somewhat in an elongated or oval shape, the speed of the cutter roll may be reduced to bring the product shape, as cut, to virtually a perfect circular shape. And, conversely, as the shape of the product coming from the cutter to the take-out conveyor is a shape which is a squat oval shape, the speed of the cutter may be increased by use of the variable speed drive 42. This enables the operator to establish the desired more perfect circular shape. Likewise, where triangular shaped, strip shaped or polygonal shaped products are being cut, the shape of the elongation or contraction of the products may be controlled and the same is true where the product is free form or of another shape. It will be understood that all of the above changes may be achieved without shutting down the production line such as required when different gears set are needed to be substituted to obtain the desired speed ratios. A suitable variable speed drive for the cutter roll is: Peerless-Winsmith, Inc., Springville, N.Y., Winsmith Single Reduction Speed Reducer No. 917MDT, 50:1; Seco Electronics, Lancaster, S.C., Seco 1 Hp DC Motor No. MOH6211100 and Seco DC Motor Control No. 160.

The off loading conveyor assembly 17 may be of conventional construction and operated at the same linear speed as required in the production line in which the unit 10 is installed. A height adjustment mechanism 43 is included with the conveyor assembly 17 for properly aligning the unit with an associated production conveyor (not shown).

The improved sheeter disclosed incorporates infinitely variable speed drives on the cutter, for the front roll and for the back roll. The variable speed drives can be coupled in circuit with a master speed controller (not shown) so that when necessary to speed up or slow down the production line and thus the sheeter, the selected speed relationships between the cutter and roll drives can be changed accordingly while maintaining the desired inter relationships of the drive speeds.

While the improved sheeter machine has been described in connection with the preferred embodiment, it is not intended to limit the invention to the particular form set forth, but on the contrary, it is intended to cover such alternatives, modifications, and equivalence as may be included within the sphere and scope of the invention as defined by the appended claims.

We claim:

1. An improved sheeter machine serving to receive a masa dough from a supply thereof comprising;

a frame, front and back sheeter rolls on said frame, wherein said rolls have substantially cylindrical exterior surfaces and first and second shafts, respectively, said first and second shafts being rotatably mounted on said frame in a substantially parallel relationship;

said rolls being arranged so that their exterior surfaces are spaced slightly apart so as to define a nip disposed to receive masa dispensed from the supply thereof;

first and second variable speed drive means coupled to said first and second shafts serving to rotate said front and back rolls respectively to establish and control, over a variable range, a differential adhesion characteristic between the masa material to be sheeted and the exterior surfaces of each of said sheeter rolls so that the sheeted material below the nip separates from the back roll while adhering to the front roll;

rotatable cutter means extending laterally of the path of masa travel serving to engage and cut the masa against the front roll as it rotates, the masa being cut into predetermined shapes characteristic of the cutter means;

stripper wire means fixedly mounted on said frame engaging said front roll for lifting the cut pieces of masa from the exterior surface of the front roll, the co-action of the fixed stripper wire with the rotating masa pieces tending to compress the masa pieces to shrink in the direction of travel to a dimension less than the nominal cut dimension; and third variable speed drive means coupled to said cutter means serving to rotatably drive said cutter means at selected rotational speeds so as to obtain relative rotational surface speeds the same as, and slower than, and faster than the rotational surface speed of said front roll permitting control over the cut length of the masa pieces so as to obtain an accurate cut length of the sheeted masa pieces irrespective of variables in the masa qualities and the sheeter rolls relative speeds.

2. The sheeter machine of claim 1 wherein said exterior surface of said front roll has substantially greater dough attracting "tooth" than the surface of the back roll.

3. The sheeter machine of claim 1 wherein said first and second drive means serve to drive said sheeter rolls shafts so that the rolls rotate at different exterior surface speeds such that the speed of said front roll is no slower than the surface speed of the back roll.

4. The sheeter machine of claim 1 wherein one of said rolls is made to a smaller diameter than the other roll.

5. The sheeter machine of claim 1 wherein the front roll is convex in profile and the back roll is concave and complimentary in profile to the first roll.

* * * * *